June 9, 1964
M. SPINN
3,136,066
LINE MEASURING DEVICE
Filed July 6, 1962
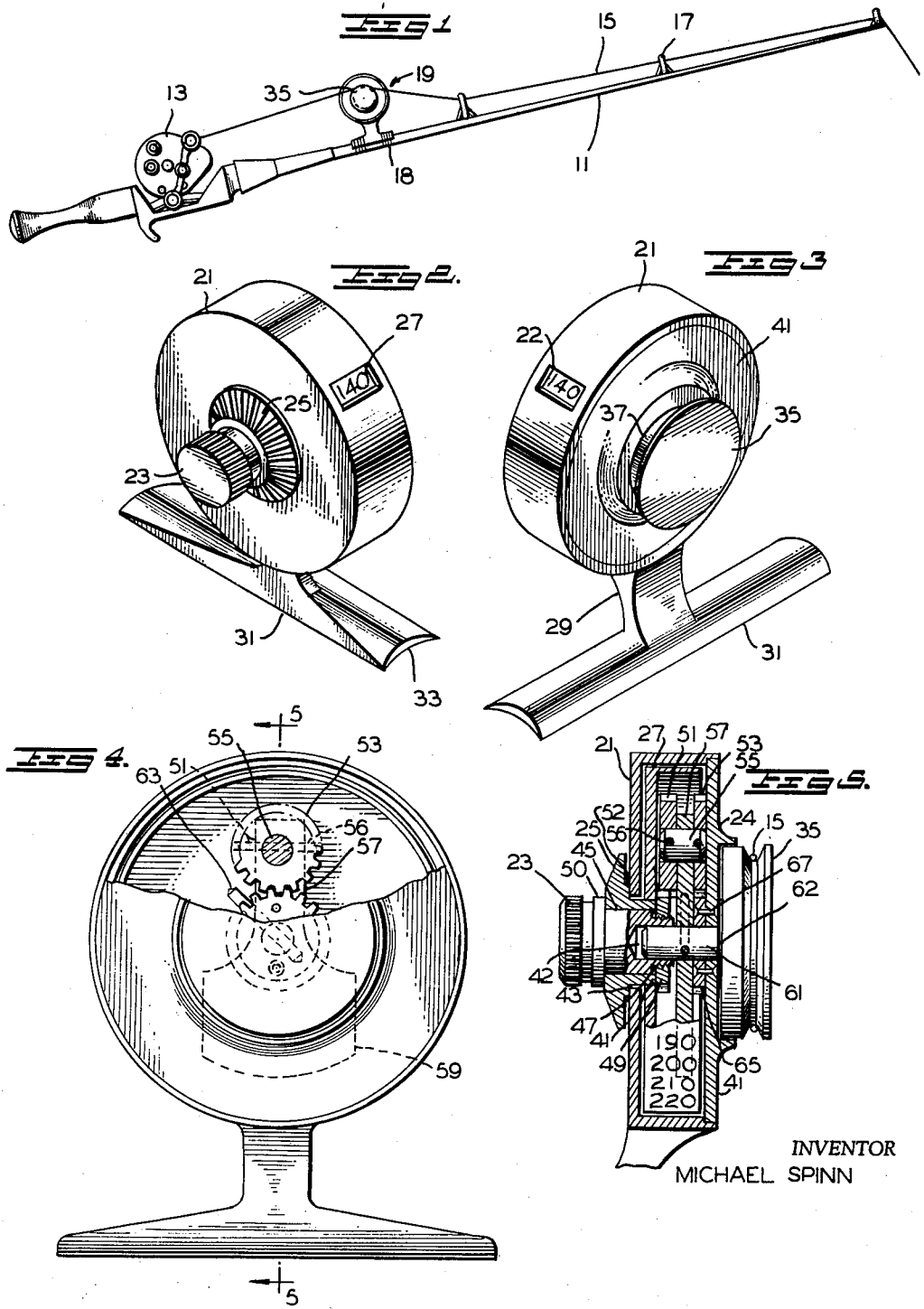
INVENTOR
MICHAEL SPINN

United States Patent Office 3,136,066
Patented June 9, 1964

3,136,066
LINE MEASURING DEVICE
Michael Spinn, 93 Brookdale Gardens, Bloomfield, N.J.
Filed July 6, 1962, Ser. No. 207,932
2 Claims. (Cl. 33—129)

This invention relates generally to line measuring devices and more specifically to a device which may be attached to a fishing rod in order to measure the amount of line let out from the reel attached to said rod.

It is highly advantageous for a fisherman to know the amount of line which has been let out from the reel during the fishing operation. If a fairly precise determination can be made of the amount of line which has been let out, then the proper fishing depth can be accurately maintained after a school of fish has been located. There are many well-known ways of locating such schools and new compact electronic equipment is constantly being developed, allowing fishermen to determine such depths.

One of the standard methods of indicating to the fisherman the amount of line being let out is to mark the line by means of color indicia or the like. Such markings become quite confusing after a certain amount of line is let out and are also very distracting in attempting to keep track of these markings.

Accordingly, it is an object of this invention to provide a line measuring device which may be mounted on a rod or the like and which will indicate the amount of line let out at a single glance.

Another object of the invention is to provide a device measuring the amount of fishing line let out from the reel.

Yet another object of this invention is to provide a mechanical line measuring device for use with fishing rods.

A further object of this invention is to provide a line measuring device which may be mounted on any type of fishing rod.

A still further object of this invention is to provide a line measuring device for use with fishing rods which is relatively simple to use and economical to manufacture.

These and other objects of the invention will become apparent from the following description when taken in conjunction with the accompanying drawings wherein:

FIG. 1 is an elevational view of the device of the present invention mounted on a fishing rod which includes a reel;

FIG. 2 is a perspective view of the line measuring device;

FIG. 3 is another perspective view of the device showing the opposite side from that shown in FIG. 2;

FIG. 4 is an elevational view partly broken away; and

FIG. 5 is a sectional view of the device taken through line 5—5 of FIG. 4.

Turning now more specifically to the drawings, FIG. 1 shows a fishing rod 11 of a general type having a reel 13 mounted thereon. The line 15 is threaded through the guides 17 and extends outwardly from the end of the pole in the usual manner. The measuring device of the present invention is shown mounted to the pole by means of line or the like 18 so that it extends upwardly substantially in line with the reel 13. The line passes about the wheel 35 for one complete clockwise turn and as the line is played out the reel accordingly turns in a clockwise direction.

FIG. 2 shows one side of the cylindrical housing 21 with a first knurled knob 23 having a shaft extending into the casing and a second knurled member 25. The knurled member 25 is used for initially setting the indicia dial 27 and the knurled knob 23 is used for locking the dial at its initial setting, both of which operations will be explained more thoroughly in connection with the detailed showing of the device.

FIG. 3 shows the opposite side of the cylindrical housing 21 with the aperture 22 in the circumferential portion of the casing. In order that the device may be disassembled, a circular plate 41 is press-fit into one side of the housing 21. A wheel member 35 having a groove 37 therein has a shaft 61 passing through the plate 41. The base for the casing is comprised of a leg member 31 having a concave bottom surface for mounting on a circular rod and an arm 29 integral with the base 31 and the housing 21 for maintaining the device in the proper position.

FIGS. 4 and 5 show the mechanical details of the device. The knurled reset member 25 extends through an aperture 43 within the housing and abuts against the outer face of the housing 21. In order to provide a means for locking the indicating portion of the device in a binding fashion, the knurled knob 23 has an integral spindle 45 extending through the hollow portion of the reset member 25 and is threaded at its outer end 47. A cylindrical cup-shaped member 27 having indicia on the outer circumference thereof is press-fit about the reduced shaft section 41 of the reset member 25 and a circular gear 49 is threaded onto the outer end 47 of the locking member 23. Therefore, when the locking knob 23 is turned counter-clockwise, the gear 49 has no binding effect against reset dial 25 and it may be turned freely by means of member 25 in order to match the desired indicia on the dial with the aperture 22 in the housing.

However, when knurled knob 23 is turned clockwise and tightened into a binding position, the gear member 49 and the sleeve 50 bind respectively against the indicia cup member 27 and the reset member 25. This, in effect, creates a single unit consisting of cup 27, gear 49, reset member 25 and locking member 23. Therefore, if the gear member 49 turns, then the entire locked unit will also turn. The space created between the outer face of the indicia cup 27 and the abutting shoulder 52 of the reset member is designed so as to allow a small amount of axial movement of the entire locked unit. This is done so that there will be substantially no frictional drag between the abutting shoulder 52 and the outer facing of housing 21.

The wheel 35 is shown with the line 15 passing about the groove 37 therein. A reduced cylindrical section 62 and a shaft 61 are integral with the wheel. The reduced section 62 abuts against the outer face of plate 41 and the shaft 61 extends through the plate 41 and into the retaining bore hole 42 of the reset member 23.

A further circular gear 65 passes over the shaft 61 and is fixed to the inner face of plate 41 by means such as rivets 67. Accordingly, the shaft 61 is free to rotate within the plate 41 and the fixed gear 65.

A substantially flat plate member having an arm 57 and a counterbalance 59 is mounted on the shaft 61 by means such as pin 63 and rotates therewith. Near the outer end of the arm 57 planetary gears 51 and 53 are rotatably mounted on the arm by means such as by being press fit onto opposite ends of a pin 55 which passes through the arm and is rotatable therein. If desired, these planetary gears 51 and 53 may also be secured to the pin 55 by means such as small securing pins 56 in order to prevent possible independent rotation due to frictional wear.

Planetary gear 51 meshes with the gear member 49 while planetary gear 53 meshes with the fixed gear 65.

The gears 49, 51, 53 and 65, together with the above explained supporting and rotating structure, form what is known as an epicyclic gear train. In operation, rotation in a clockwise direction of the wheel 35 by the line 15 causes the rotation of the arm 57. Since the arm 57 carries the identically geared planetary gears 51 and 53, they will rotate in a fixed ratio in accordance with the gearing of the fixed gear 65 about which gear 53 planetates. The effect of the rotation on the gear 49 due to the planetation of gears 51 and 53 is a determinable fixed result. Therefore, with the ratio between all gears determined, the relationship between the rotation of the wheel and its particular fixed diameter may be related to the rotation of gear 49 and the indicia may be placed at proper intervals about the circumference of member 27 in order to supply an indication, as in the present illustration, of the amount of line let out in feet. In the present device as produced, there exists an epicyclic gearing ratio of 1156:1.

Since the epicyclic type gear train is used, the device can be set to indicate zero feet through the aperture by merely disengaging the final gear 49 from binding contact with the indicia dial and adjusting it to the position that is desired as explained above.

It is to be understood that the design of the particular housing and supporting structure may be modified without departing from the scope of this invention which is to be limited only by the following claims.

I claim:

1. A line measuring device comprising a base, a cylindrical housing mounted on said base, an aperture in the circumferential face of said housing, a cup member rotatable within said housing and having indicia on the side wall thereof, a hollow cylindrical member extending centrally through one side of said housing and the bottom of said cup member and rotatable therein, a knob having a threaded spindle extending through said hollow cylindrical member, a borehole extending axially into the outer end of said threaded spindle, a first circular gear threaded onto said spindle so as to frictionally bind said cup member to said hollow cylindrical member, a wheel member centrally grooved about the circumference thereof, a shaft extending perpendicularly from the axis of said wheel through the other side of said housing and into said borehole, a second circular gear mounted on said shaft and secured to the inner face of said other side of said housing, a spacer plate secured perpendicularly to said shaft within said housing, a pin rotatably extending through said plate substantially parallel to said shaft, and first and second planetary gears secured to said pin on either side of said spacer plate, one of said planetary gears meshing with said first circular gear and the other of said planetary gears meshing with said second circular gear.

2. The apparatus of claim 1 wherein said base has a concave face for mounting on a tubular support.

References Cited in the file of this patent

UNITED STATES PATENTS

| | | |
|---|---|---|
| 2,762,129 | Morgan | Sept. 11, 1956 |
| 2,819,698 | Kirsten | Jan. 14, 1958 |
| 2,833,044 | Helms | May 6, 1958 |